US012077869B2

(12) United States Patent
Fujita et al.

(10) Patent No.: US 12,077,869 B2
(45) Date of Patent: Sep. 3, 2024

(54) HEAT TREATMENT APPARATUS

(71) Applicants: DOWA THERMOTECH CO., LTD., Tokyo (JP); TOYOTA JIDOSHA KABUSHIKI KAISHA, Aichi (JP)

(72) Inventors: Takahiro Fujita, Shizuoka (JP); Masayoshi Ikeyama, Aichi (JP); Mitsue Koga, Aichi (JP)

(73) Assignees: DOWA THERMOTECH CO., LTD., Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 687 days.

(21) Appl. No.: 17/269,115

(22) PCT Filed: Aug. 21, 2019

(86) PCT No.: PCT/JP2019/032584
§ 371 (c)(1),
(2) Date: Feb. 17, 2021

(87) PCT Pub. No.: WO2020/040180
PCT Pub. Date: Feb. 27, 2020

(65) Prior Publication Data

US 2021/0246539 A1 Aug. 12, 2021

(30) Foreign Application Priority Data

Aug. 23, 2018 (JP) ................................ 2018-156011

(51) Int. Cl.
*C23C 8/20* (2006.01)
*H05B 3/06* (2006.01)

(52) U.S. Cl.
CPC ................. *C23C 8/20* (2013.01); *H05B 3/06* (2013.01); *H05B 2203/016* (2013.01)

(58) Field of Classification Search
USPC ............................................ 118/47; 148/218
See application file for complete search history.

(56) References Cited

U.S. PATENT DOCUMENTS

| | | | |
|---|---|---|---|
| 3,729,570 | A | 4/1973 | Beck |
| 4,168,425 | A | 9/1979 | Bauer et al. |

(Continued)

FOREIGN PATENT DOCUMENTS

| | | |
|---|---|---|
| CN | 101315878 | 12/2008 |
| CN | 103597308 | 2/2014 |

(Continued)

OTHER PUBLICATIONS

Extended European Search Report in counterpart EP application No. 19851819.3, dated Sep. 23, 2021.

(Continued)

*Primary Examiner* — Yewebdar T Tadesse
(74) *Attorney, Agent, or Firm* — Greenblum & Bernstein, P.L.C.

(57) ABSTRACT

A heat treatment apparatus includes: a treatment chamber unit that is, inside a furnace shell, detachably fixed to the furnace shell; and a power supply portion, in which the treatment chamber unit includes: a treatment container in which a heat treatment is performed on a workpiece; a heat insulating material provided inside the treatment container; a heater that has a heating element located inside the treatment container and has a terminal located outside the treatment container; and a busbar that is provided on the outside of the treatment container and is electrically connected to the terminal of the heater, the power supply portion is provided outside the treatment container, and the busbar and the power supply portion are detachably connected to each other.

6 Claims, 7 Drawing Sheets

(56) References Cited

U.S. PATENT DOCUMENTS

| | | | | | |
|---|---|---|---|---|---|
| 4,332,552 | A * | 6/1982 | Seelandt | F27D 1/06 | 432/247 |
| 2013/0305985 | A1 * | 11/2013 | Katsumata | F27B 5/06 | 118/47 |
| 2014/0097174 | A1 | 4/2014 | Katsumata et al. | | |
| 2016/0312352 | A1 * | 10/2016 | Katsumata | F27B 5/04 | |

FOREIGN PATENT DOCUMENTS

| | | |
|---|---|---|
| GB | 861258 A | 2/1961 |
| JP | H04-363582 | 12/1992 |
| JP | H07-248193 | 9/1995 |
| JP | 2000-208236 | 7/2000 |
| JP | 2002-294429 | 10/2002 |
| JP | 2002-365276 | 12/2002 |
| JP | 2007-126721 | 5/2007 |
| JP | 2007-127349 | 5/2007 |
| JP | 2007-127350 | 5/2007 |
| JP | 2009-52838 | 3/2009 |
| JP | 2010-017635 | 1/2010 |
| JP | 2013-002728 | 1/2013 |
| JP | 2015-81685 | 4/2015 |

OTHER PUBLICATIONS

International Search Report issued in International Patent Application No. PCT/JP2019/032584, dated Oct. 15, 2019 (and English translation thereof).

Written Opinion of the International Searching Authority issued in International Patent Application No. PCT/JP2019/032584, dated Oct. 15, 2019.

Chinese Office Action in counterpart Chinese Application No. 2019800554982, dated Mar. 25, 2022.

* cited by examiner

HEAT TREATMENT APPARATUS

TECHNICAL FIELD

The present invention relates to a heat treatment apparatus that performs a heat treatment on a workpiece such as an automotive part or a machine part.

BACKGROUND ART

As a heat treatment apparatus that performs a heat treatment on a workpiece, Patent Document 1 has disclosed a small vacuum carburizing furnace that performs a carburizing treatment on a workpiece. Further, Patent Document 2 has disclosed an installing structure of a ceramic heater to be installed on a furnace wall of a heat treatment apparatus. Patent Document 2 has disclosed a structure in which a power feeding terminal connected to a power supply and a busbar are connected and the busbar and the ceramic heater are connected via a conductive cable.

PRIOR ART DOCUMENT

Patent Document

[Patent Document 1] Japanese Laid-open Patent Publication No. 2007-127349

[Patent Document 2] Japanese Laid-open Patent Publication No. 2000-208236

SUMMARY OF THE INVENTION

Problems to be Solved by the Invention

Heat insulating materials and heaters, and so on, which are components of the heat treatment apparatus, deteriorate according to the operation time of the apparatus, so that it is necessary to periodically replace various components in order to maintain the performance of the heat treatment apparatus. The replacement work of parts is performed with the heat treatment apparatus being stopped, and therefore, an increase in time spent on the replacement work will result in a decrease in productivity. Therefore, the replacement work of parts is preferably performed in a shorter time.

From the viewpoint of the replacement of the heat insulating material, Patent Document 1 has disclosed an apparatus structure in which the heat insulating material can be replaced by removing a lid at the rear of a heating chamber. However, in the apparatus structure in Patent Document 1, it is necessary to remove a plurality of heaters installed in the heating chamber when removing the heat insulating material from the heating chamber. The damage or deformation of the heater can cause failure, and thus, when removing the heaters from the heating chamber, the work needs to be performed carefully so as not to cause the damage, deformation, or the like of the heater. Therefore, in the apparatus structure in Patent Document 1, the time to be spent on the replacement work of the heat insulating material increases.

Further, Patent Document 2 has not disclosed the replacement of heat insulating materials, heaters, or the like.

The present invention has been made in consideration of the above-described circumstances, and has an object to provide a heat treatment apparatus capable of shortening the work time for replacing parts such as a heat insulating material or a heater and shortening the time for stopping the apparatus.

Means for Solving the Problems

As one aspect of the present invention that solves the above-described problems, a heat treatment apparatus includes: a treatment chamber unit that is, inside a furnace shell, detachably fixed to the furnace shell; and a power supply portion, in which the treatment chamber unit includes: a treatment container in which a heat treatment is performed on a workpiece; a heat insulating material provided inside the treatment container; a heater that has a heating element located inside the treatment container and has a terminal located outside the treatment container; and a busbar that is provided on the outside of the treatment container and is electrically connected to the terminal of the heater, the power supply portion is provided outside the treatment container, and the busbar and the power supply portion are detachably connected to each other.

In the heat treatment apparatus according to the present invention, the treatment container, the heat insulating material, and the heater are unitized as the treatment chamber unit and the treatment chamber unit is detachably fixed to the furnace shell, and thus the entire treatment chamber unit can be removed from the furnace shell. That is, there is no longer required a work of removing the heater when removing the treatment chamber unit from the furnace shell to replace the heat insulating material. In the heat treatment apparatus according to the present invention in particular, the heater terminal is connected to the busbar via a terminal wire. Therefore, by simply canceling the connection between the busbar and the power supply portion provided outside the treatment container, the treatment chamber unit can be brought into a state of being removed from the furnace shell without performing a wiring process around each of the heater terminals.

Effect of the Invention

According to the present invention, it is possible to shorten the work time for replacing parts such as a heat insulating material or a heater of the heat treatment apparatus and shorten the time for stopping the apparatus.

EMBODIMENTS FOR CARRYING OUT INVENTION

Figure 1:
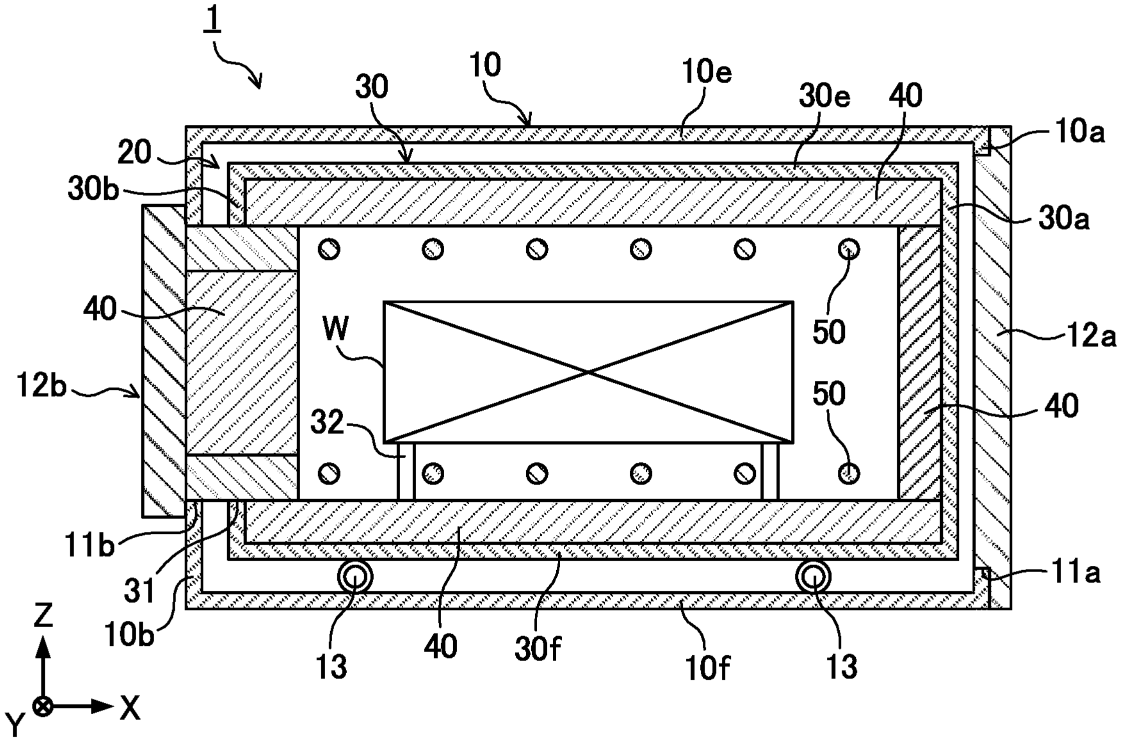
FIG. 1 is a cross-sectional view that illustrates a schematic configuration of a heat treatment apparatus according to one embodiment of the present invention, which is vertical to a Y direction.

Hereinafter, one embodiment of the present invention will be explained with reference to the drawings. Incidentally, in this description and the drawing, the components having substantially the same functional configuration are denoted by the same reference numerals and symbols, thereby omitting the duplicate explanation.

Figure 2:
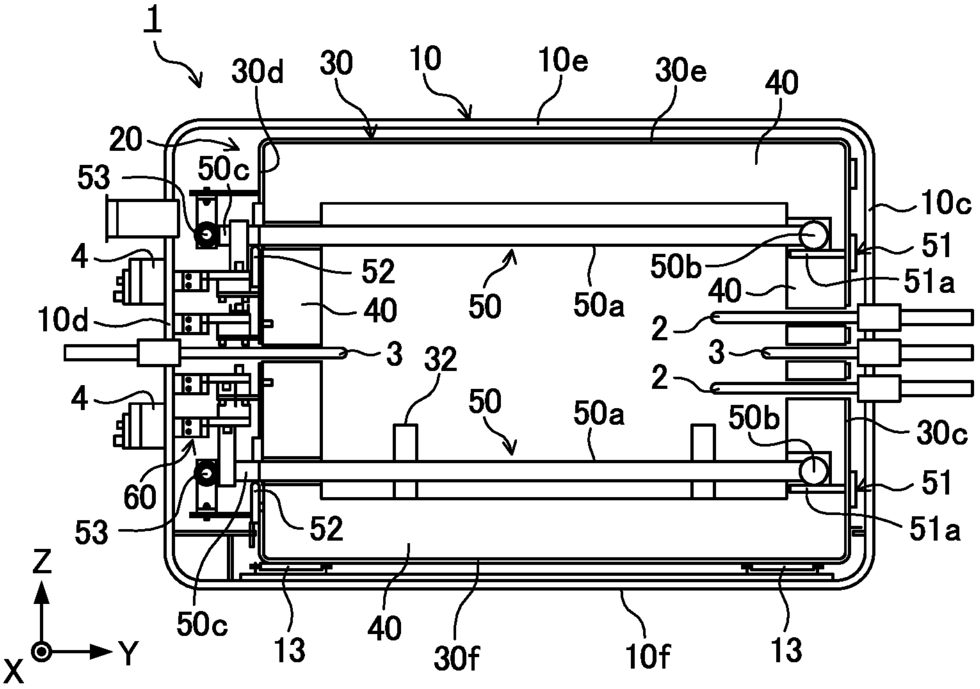
FIG. 2 is a cross-sectional view that illustrates the schematic configuration of the heat treatment apparatus, which is vertical to an X direction, where in order to make the drawing easier to see, illustration of a workpiece and hatching indicating cross sections are omitted.

As illustrated in FIGS. 1 and 2, a heat treatment apparatus 1 in this embodiment includes a treatment chamber unit 20 inside a furnace shell 10. The treatment chamber unit 20 includes a treatment container 30 where a workpiece W is housed to be subjected to a heat treatment, a heat insulating material 40 fixed to an inner surface of the treatment container 30, and a plurality of heaters 50 that extend in a Y direction penetrating the treatment container 30 and the heat insulating material 40. Incidentally, in this description, an "X direction" is the depth direction of the furnace shell 10 (the carrying direction in the treatment chamber unit 20), the "Y direction" is the width direction of the furnace shell 10, and a "Z direction" is the height direction of the furnace shell 10. The respective directions X to Z are vertical to one another.

The treatment container 30 in this embodiment is formed into a rectangular parallelepiped shape. Out of wall surface portions 30*a*, 30*b* at both ends of the treatment container 30 in the X direction (a "side surface portion 30*a*" and a "side surface portion 30*b*" below), in the side surface portion 30*b* on one side, an opening 31 through which the workpiece W passes is formed. As the raw material of the treatment container 30, a metal such as, for example, SUS310S, SUS304, or SS400 is used. As described previously, the heaters 50 penetrate the treatment container 30 and the heat insulating material 40, and thus, a metal material that is resistant to heat escaping through through holes of the heat insulating material 40 and is unaffected by an atmosphere gas for the heat treatment is preferably used for the raw material of the treatment container 30. Incidentally, the heat treatment to be performed in the treatment container is heat treatments such as, for example, vacuum carburizing, carbonitriding, and nitriding, and the temperature of the heat treatment ranges from 500 to 1100° C. Further, products to be subjected to the heat treatment are automotive parts such as automotive gears, for example.

Out of wall surface portions 10*a*, 10*b* at both ends of the furnace shell 10 in the X direction (a "side surface portion 10*a*" and a "side surface portion 10*b*" below), in the side surface portion 10*a* of the furnace shell 10 facing the side surface portion 30*a* of the treatment container 30, an opening 11*a* through which the treatment chamber unit 20 passes is formed. On the other hand, in the side surface portion 10*b* of the furnace shell 10, which faces the side surface portion 30*b* of the treatment container 30, an opening 11*b* through which the workpiece W passes is formed. The treatment chamber unit 20 is detachably fixed to the furnace shell 10, and is configured to be carried to the outside or inside of the furnace shell 10 through the opening 11*a* of the furnace shell 10. The method of fixing the treatment chamber unit 20 to the furnace shell 10 is not limited in particular, but only needs to be a fixing method that allows the treatment container 30 to be held in a stable position. The furnace shell 10 is provided with an openable and closable furnace shell door 12*a* that closes the opening 11*a*. Further, the furnace shell 10 is provided with an openable and closable furnace shell door 12*b* including the heat insulating material 40 that closes the opening 31 of the treatment container 30 and the opening 11*b* of the furnace shell 10.

The workpiece W carried into the treatment container 30 is supported by a plurality of support post members 32 provided in the treatment container 30. Incidentally, in the case of the workpiece W being a part such as an automotive gear, for example, a tray, basket, or the like on which a plurality of parts are placed is supported by the support post members 32, and thereby, the workpiece W is brought into a state supported indirectly.

The raw material of the heat insulating material 40 is not limited in particular as long as it can obtain a heat insulating effect, and for example, heat-resistant brick, ceramic boards, ceramic fibers, a vacuum heat insulating material, a porous heat insulating material, carbon boards, a carbon felt, or the like is used. Further, heat insulating materials of different raw materials may be arranged in layers. In the case where a carburizing treatment is performed in the treatment container 30, burning out the soot in the treatment container 30 generated by the carburizing treatment by air periodically and removing it, what is called burnout is performed, and therefore the heat insulating material 40 is preferred to be a non-oxidizing raw material. From the viewpoint of heat insulating performance and oxidation due to burnout, for example, a board made of alumina-silica and a ROSLIM Board (registered trademark), which is a high performance heat insulating material, may be arranged in an overlapping manner. Further, it is preferable that the through holes in the heat insulating material 40 through which the heaters 50 pass each should have a long hole shape so that thermal expansion of the heater 50 is not regulated, in order to make the through hole less susceptible to the thermal expansion of the heater 50.

Figure 3:
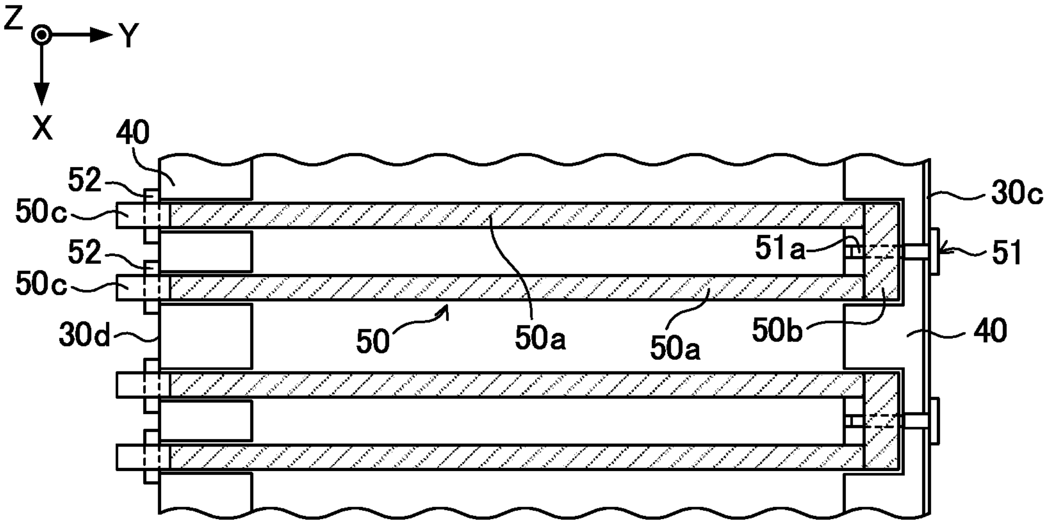
FIG. 3 is a view of a heater shape in a treatment chamber unit seen from above in a Z direction.

The heaters 50 in this embodiment are arranged in the vicinity of a wall surface portion 30*e* at an upper end (a "top surface portion 30*e*" below) and in the vicinity of a bottom surface portion 30*f* of the treatment container 30 in the Z direction so as to be able to heat the workpiece W supported by the support post members 32 from above and below. As illustrated in FIG. 3, the heaters 50 in this embodiment each have a U shape. In the case where a carburizing treatment is performed in the treatment container 30, burning out the soot in the treatment container 30 generated by the carburizing treatment by air periodically and removing it, what is called burnout is performed, and therefore heating elements 50*a* of the heaters 50 each are preferred to be a non-oxidizing raw material. The heating elements 50*a* located inside the treatment container 30 each are formed of SiC, for example.

As illustrated in FIG. 2 and FIG. 3, out of both end portions of the single heater 50 in the Y direction, a folded portion 50*b* of the heating element 50*a*, which corresponds to one end portion, and heater terminals 50*c* of the two heating elements 50*a*, which correspond to the other end portion, are supported by heater supporting members 51, 52 fixed to a first wall surface portion 30*c* (a "side surface portion 30*c*" below) and a second wall surface portion 30*d* (a "side surface portion 30*d*" below) respectively, which are a pair of wall surface portions at both ends of the treatment container 30 in the Y direction. The heater supporting member 51 includes an extending portion 51*a* having a shape extending from the side surface portion 30*c* of the treatment container 30 toward the inside of the treatment container 30. The folded portion 50*b* is supported by the extending portion 51*a* of the heater supporting member 52. When the heater supporting members 51, 52 are fixed to the treatment container 30, for example, by bolts, they are each preferably fixed to have a gap or play in consideration of thermal expansion of the treatment container 30. In this embodiment, contact portions of the heater supporting members 51, 52 with the heater 50 each have a shape that makes linear contact with the heater 50. The heater 50 is supported in a state of being just placed on the heater supporting members 51, 52, and is not specifically fixed to the heater supporting members 51, 52. A supporting structure of the heater 50 is not limited in particular, but as in this embodiment, by using a supporting structure in which the heater 50 is just placed on the heater supporting members 51, 52, the thermal expansion of the heater 50 is no longer regulated and the heater supporting members 51, 52 can be less susceptible to the effect of the thermal expansion of the heater 50. Incidentally, the heater supporting members 51, 52 are formed of an insulating material such as, for example, alumina.

Figure 4:
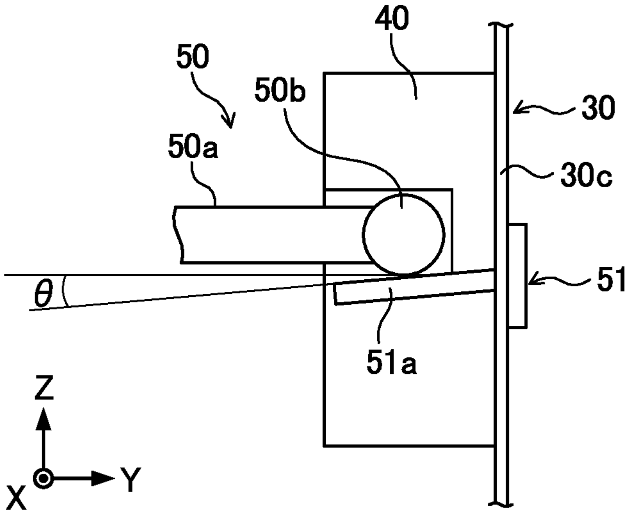
FIG. 4 is an enlarged view of a heater supporting member that supports a folded portion of a U-shaped heater.

As illustrated in FIG. 4, the extending portion 51*a* of the heater supporting member 51 in this embodiment has a shape to be lowered in height as it moves away from the side surface portion 30*c* of the treatment container 30. That is, the extending portion 51*a* has a shape that slopes downward at an angle θ with respect to the horizontal plane as it moves away from the side surface portion 30*c* of the treatment container 30. According to such a heater supporting member 51, when the folded portion 50*b* varies in position to the side surface portion 30*c* side of the treatment container 30 due to the thermal expansion of the heater 50, the folded portion 50*b* must move up the sloped extending portion 51*a*, so that the folded portion 50*b* is less likely to vary in position. Therefore, even when the heater 50 expands thermally, the heater 50 is less likely to come into contact with the heat insulating material 40, thereby making it possible to suppress the deformation, damage, or the like of the heater 50. Further, in the case where the heat treatment to be performed in the treatment container is the carburizing treatment, after the carburizing treatment is performed for several times, soot adheres to the surface of the heat insulating material. From the viewpoint of conductivity, it is not preferable for the heater 50 to come into contact with the soot-adhering heat insulating material 40. Also from such a viewpoint, the extending portion 51*a* of the heater supporting member 51 that supports the folded portion 50*b* preferably has a shape to slope downward with respect to the horizontal plane as it moves away from the wall surface portion of the treatment container 30 (the side surface portion 30*c* in this embodiment).

Figure 5:
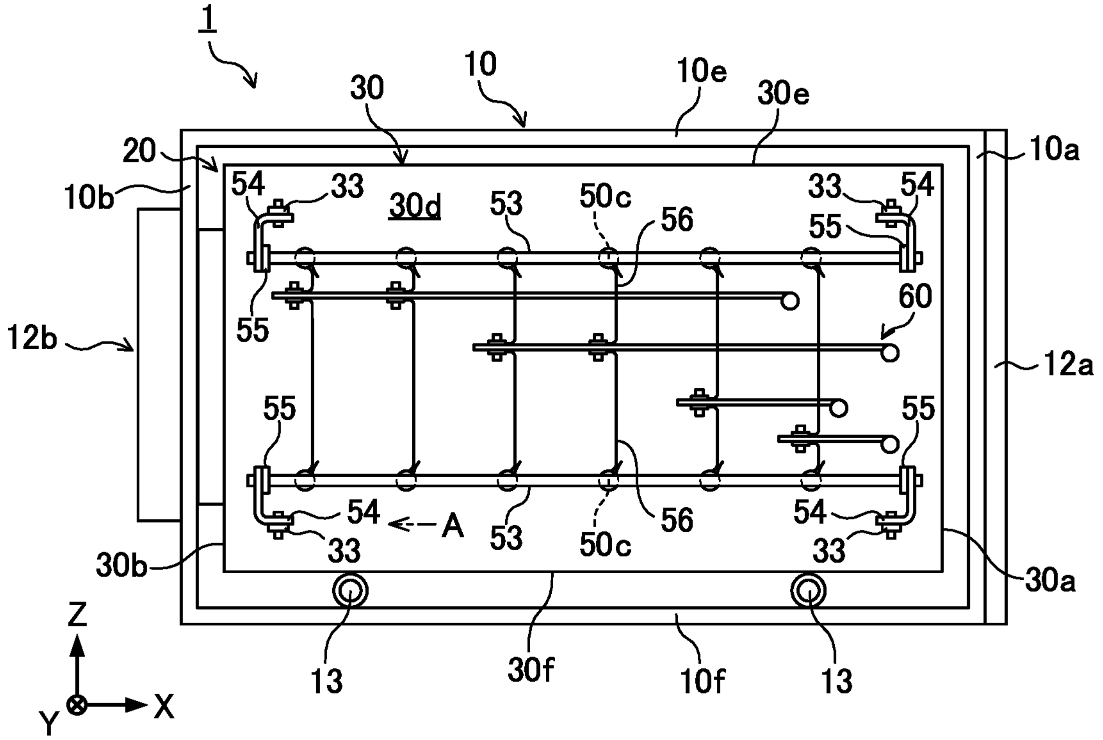
FIG. 5 is a side view of the heat treatment apparatus, where a furnace shell on a paper front side is not illustrated.
Figure 6:
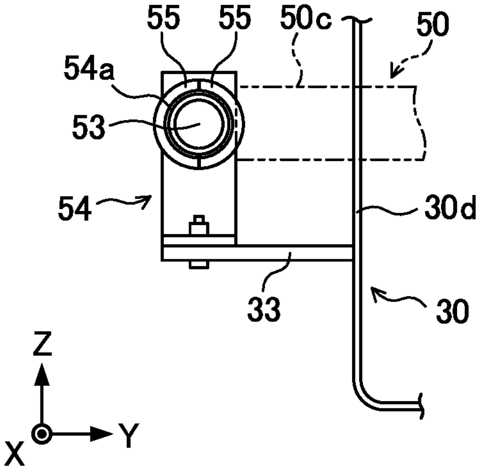
FIG. 6 is a view illustrating a structure of attaching a pop-out prevention member to a treatment container, which is seen from an arrow A in FIG. 5.

As illustrated in FIG. 5 and FIG. 6, in this embodiment, pop-out prevention members 53 that prevent the heaters 50 from popping out are provided. The shape of the pop-out prevention member 53 is not limited in particular, but a pipe formed of an insulating member such as alumina, for example, is employed. The pop-out prevention member 53 is fixed to the treatment container 30 with its longitudinal direction being the X direction. The pop-out prevention members 53 are provided at a height equivalent to the respective heater terminals 50*c* of a plurality of the heaters 50 arranged in the vicinity of the top surface portion 30*e* of the treatment container 30 and at a height equivalent to the respective heater terminals 50*c* of a plurality of the heaters 50 arranged in the vicinity of the bottom surface portion 30*f*. On the side surface portion 30*d* of the treatment container 30, plates 33 to which the pop-out prevention member 53 is attached are provided and fixed so as to project from the side surface portion 30*d*. The method of fixing the plate 33 to the treatment container 30 is not limited in particular, but the both are fixed by welding, for example. An L-shaped bracket 54 is fixed to an end of the plate 33 (an end portion opposite to that on the treatment container 30 side) by bolt fastening, for example. The L-shaped bracket 54 has two plane surface portions, in one of which an opening 54*a* is formed, and is fixed with the opening 54*a* facing in the X direction. A longitudinal end portion of the pop-out prevention member 53 is inserted into the opening 54*a* of the L-shaped bracket 54, and two semicircular sleeves 55 are fixed to each other with the pop-out prevention member 53 being sandwiched therebetween. The plate 33 and the L-shaped bracket 54 are provided at four corners on the side surface portion 30*d* of the treatment container 30 in order to support the longitudinal end portions of the pop-out prevention members 53.

As described previously, in the case where the extending portion 51*a* of the heater supporting member 51 that supports the folded portion 50*b* of the U-shaped heater 50 slopes, the folded portion 50*b* is less likely to move toward the side surface portion 30*c* side of the treatment container 30. In the meantime, when the thermal expansion of the heater 50 occurs in this case, the heating elements 50*a* becomes easier to extend from the side surface portion 30*c* to the side surface portion 30*d*, and the heater terminal 50*c* is more likely to vary in position to the outward side of the side surface portion 30*d*. When the pop-out prevention member 53 is provided on this occasion as in this embodiment, the positions of the heater terminals 50*c* can be regulated, and thus, it makes it easier to support the heaters 50 at a desired position. By preventing the positions of the heaters 50 from being displaced in this way, it is possible to suppress the temperature variation of the atmosphere in the treatment container 30 caused by the displacement of an effective heat generation zone of the heater 50. Thus, in the case of the pop-out prevention member 53 being provided, the heater supporting members 51 that support the folded portions 50*b* of the U-shaped heaters 50 are also preferably provided as in this embodiment.

As illustrated in FIG. 2, a thermocouple 2 is inserted into, out of wall surface portions 10*c*, 10*d* at both ends of the furnace shell 10 in the Y direction (a "side surface portion 10*c*" and a "side surface portion 10*d*" below), the side surface portion 10*c* on one side. The thermocouple 2 penetrates the treatment container 30, and a tip portion of the thermocouple 2 is located further inward of the heat insulating material 40 in the treatment container 30. When a plurality of the thermocouples 2 are provided, the respective thermocouples can be used separately, for example, as a thermocouple for temperature control in the treatment container 30 and a thermocouple for temperature monitoring in the treatment container 30. As the thermocouple 2, for example, a K-type thermocouple using a protective tube made of alumina can be employed.

Further, in addition to the thermocouple 2, examples of the component to be inserted into the treatment container 30 include a carbon concentration meter, and so on. In the case of the U-shaped heater 50, the through holes formed in the wall surface portion on one side (the side surface portion 30*d* in this embodiment) are more than the through holes formed in the wall surface portion on the other side. Therefore, the through holes for sensors to be inserted into the treatment container 30, such as the thermocouple 2 and the carbon concentration meter, are preferably provided in the wall surface portion of the treatment container 30 (the side surface portion 30*c* in this embodiment) opposite to the side where the heater terminals 50*c* project.

Further, a gas inlet 3 (a gas supply pipe) is inserted into each of a pair of the side surface portions 10*c* and 10*d* at both ends of the furnace shell 10 in the Y direction. The gas inlet 3 penetrates the treatment container 30, and a tip portion of the gas inlet 3 is located further inward of the heat insulating material 40 in the treatment container 30.

Figure 7:
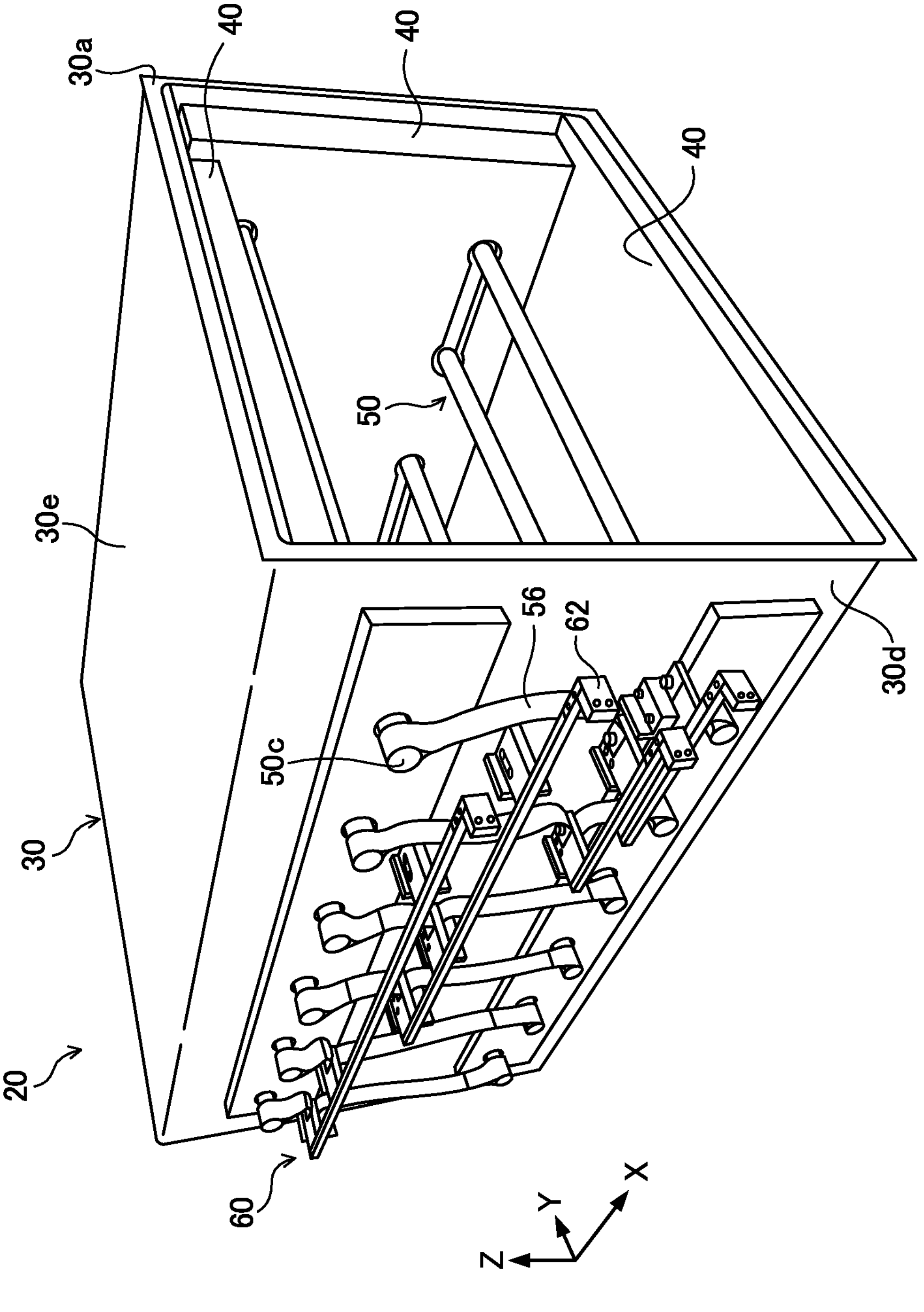
FIG. 7 is a perspective view illustrating a schematic configuration of the treatment chamber unit.
Figure 8:
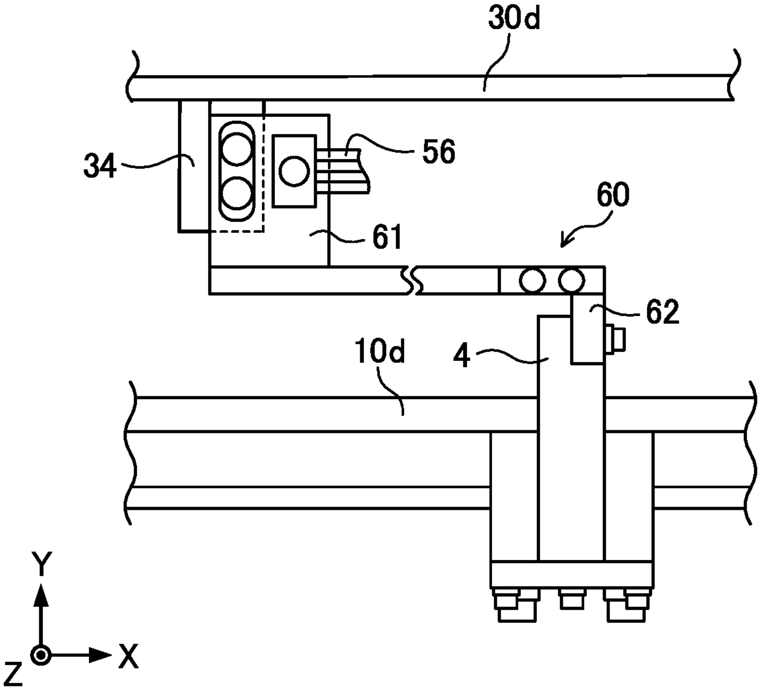
FIG. 8 is an enlarged view that illustrates a connection structure of a heater terminal and a busbar and a connection structure of the busbar and an electrode, which is seen from above in the Z direction.

As illustrated in FIG. 7 and FIG. 5, the treatment chamber unit 20 in this embodiment includes busbars 60 on the outside of the treatment container 30. The busbar 60 is arranged on the side surface portion 30*d* on the side where the heater terminals 50*c* are located, out of the side surface portions 30*c*, 30*d* at both ends of the treatment container 30 in the Y direction. As illustrated also in FIG. 8, the busbar 60 has a shape extending in the X direction. Further, the busbar 60 includes plate-shaped container-side fixing portions 61 that project to the treatment container 30 side at the end portion on the opening 31 side of the treatment container 30 and at the end portion on the side opposite thereto. The raw material of the busbar 60 is not limited in particular as long as it is conductive, but, for example, busbars made of copper are used.

In the meantime, insulating members 34 made of, for example, Teflon (registered trademark) are fixed to the side surface portion 30*d* of the treatment container 30. The insulating member 34 has such a shape as to extend outward from the side surface portion 30*d* of the treatment container 30, namely, to the busbar 60 side, and has a shape capable of making surface contact with a bottom surface of the plate-shaped container-side fixing portion 61 of the busbar 60. The busbar 60 and the treatment container 30 are fixed to each other by bolt fastening in a state where the container-side fixing portion 61 of the busbar 60 is placed on the insulating member 34. In the case where the busbar 60 and the treatment container 30 are fixed by a bolt as in this embodiment, a through hole in the container-side fixing portion 61 through which the bolt is inserted is preferred to be a long hole. This makes it possible to absorb position variation of the insulating member 34 caused by the thermal expansion of the treatment container 30, and suppress deformation of the container-side fixing portion 61 of the busbar 60, deformation of the insulating member 34, or the like.

In this embodiment, a plurality of the container-side fixing portions 61 of the busbar 60 and a plurality of the insulating members 34 fixed to the treatment container 30 are provided at intervals along the X direction, and the both are fixed to each other by the same method as above. Incidentally, the number of container-side fixing portions 61 of the busbar 60 and the number of insulating members 34 are not limited in particular, but are changed appropriately so as to allow the busbar 60 to be fixed to the treatment container 30 in a stable position according to the length of the busbar 60 in the X direction, or the like. Further, the shape of the container-side fixing portion 61 of the busbar 60 and the shape of the insulating member 34 are also not limited in particular. Furthermore, the method of fixing the busbar 60 to the treatment container 30 is also not limited to the bolt fastening. The busbar 60 only needs to be fixed to the treatment container 30 so as not to be electrically connected thereto.

Figure 9:
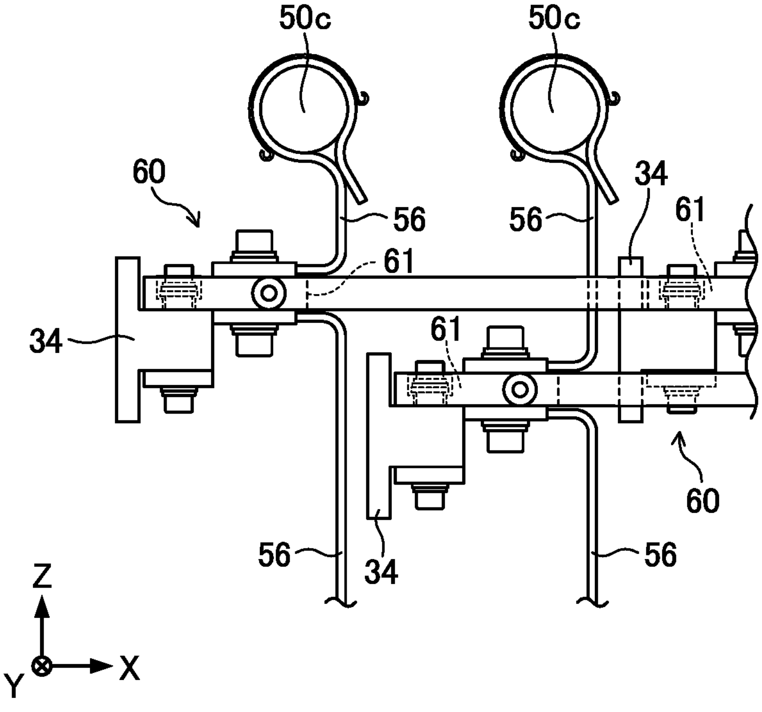
FIG. 9 is an enlarged view that illustrates the connection structure of the heater terminal and the busbar, which is seen from the Y direction.

As illustrated also in FIG. 9, one end of a terminal wire 56 is connected to the heater terminal 50*c* located on the outside of the treatment container 30, and the other end of the terminal wire 56 is connected to the container-side fixing portion 61 of the busbar 60. That is, the heater terminal 50*c* and the busbar 60 are connected via the terminal wire 56. The busbars 60 in this embodiment are arranged between the heater terminals 50*c* located in the vicinity of the top surface portion 30*e* and the heater terminals 50*c* located in the vicinity of the bottom surface portion 30*f*. The terminal wire 56 connected to the heater terminal 50*c* located in the vicinity of the top surface portion 30*e* is connected to an upper surface of the container-side fixing portion 61 of the busbar 60, and the terminal wire 56 connected to the heater terminal 50*c* located in the vicinity of the bottom surface portion 30*f* is connected to a lower surface of the container-side fixing portion 61 of the busbar 60. A plurality of the busbars 60 are provided at different heights, but the positions of the container-side fixing portions 61 of the busbars 60 are set appropriately so that the respective terminal wires 56 do not come into contact with one another even when, for example, a shake occurs in the respective terminal wires 56. Incidentally, the raw material of the terminal wire 56 is not limited in particular, but from the viewpoint of making the terminal wire 56 less susceptible to the thermal expansion of the treatment container 30 or the heater 50, for example, a band-shaped terminal wire 56 made of aluminum mesh with a flexible shape is preferably used. Further, the surface of the terminal wire 56 is preferably covered with an insulating sleeve (for example, made of glass cloth).

The busbar 60 includes a plate-shaped power reception portion 62 (FIG. 8) that projects to the furnace shell 10 side at the end portion of the treatment container 30 on the opening 31 side in the X direction. In the meantime, an electrode 4, which is one example of a power supply portion, is fixed to, of the furnace shell 10, the side surface portion 10*d* facing the busbar 60. The electrode 4 is connected to an external power supply (not illustrated), and a tip portion of the electrode 4 is located between the furnace shell 10 and the treatment container 30. Incidentally, the position where the electrode 4 is provided is not limited in particular as long as it is outside the treatment container 30. In this embodiment, the tip portion of the electrode 4 has a shape capable of making surface contact with the power reception portion 62 of the busbar 60, and the electrode 4 and the power reception portion 62 of the busbar 60 are fastened by a bolt in a state of surface contact. Thereby, the busbar 60 and the electrode 4 are fixed, and at the same time, the heater terminal 50*c*, the busbar 60, and the electrode 4 are electrically connected when energized, and thereby, the heater 50 is heated. As in this embodiment, in the case where the power reception portion 62 of the busbar 60 and the electrode 4 are fixed by a bolt, the connection between the busbar 60 and the electrode 4 can be cancelled by loosening the bolt. That is, the busbar 60 and the electrode 4 are detachably connected to each other. Incidentally, the shape and the fixing method of the power reception portion 62 of the busbar 60 and the electrode 4 are not limited to those explained in this embodiment as long as the configuration can be achieved such that the power reception portion 62 of the busbar 60 and the power supply portion provided outside the treatment container 30 are detachably connected to each other.

The heat treatment apparatus 1 in this embodiment is configured as above. In this heat treatment apparatus 1, the treatment container 30, the heat insulating material 40, and the heaters 50 are unitized as the treatment chamber unit 20, so that the entire treatment chamber unit 20 can be removed from the furnace shell 10 when replacing parts such as the heat insulating material 40 or the heater 50. The treatment chamber unit 20 is removed in the following manner concretely.

When replacing parts such as the heat insulating material 40 or the heater 50, the furnace shell door 12*a* is first opened. Then, the parts that are fixed from the outside of the furnace shell 10 to the inside of the treatment container 30, such as the thermocouple 2 and the gas inlets 3 are removed. Further, the bolt is loosened at the position of each connection between the power reception portion 62 of the busbar 60 and the electrode 4, to cancel each connection between the power reception portion 62 of the busbar 60 and the electrode 4. Thereby, the treatment chamber unit 20 installed inside the furnace shell 10 is brought into a state of being unfixed to the furnace shell 10 and the treatment chamber unit 20 itself is brought into a state of being movable along the X direction. Then, the treatment chamber unit 20 is carried out to the outside of the furnace shell 10, and in place of the carried out treatment chamber unit 20, a new different treatment chamber unit 20 is carried into the furnace shell 10. Thereafter, a fastening work of a power reception portion 62 of a busbar 60 of the carried treatment chamber unit 20 and the electrode 4 by a bolt, an assembly work of parts such as the thermocouple 2 and the gas inlets 3, and so on are performed. Thereby, the replacement work of the treatment chamber unit 20 is completed to allow the heat treatment apparatus 1 to operate again.

As above, in the heat treatment apparatus 1 in this embodiment, the treatment chamber unit 20 is carried out of the furnace shell 10, and thereby, parts such as the heat insulating material 40 and the heaters 50 can be removed together. Particularly, since the heater terminal 50*c* is connected to the busbar 60 via the terminal wire 56, the treatment chamber unit 20 can be brought into a state where it can be carried out of the furnace shell 10 without removing wirings of the heaters 50 by simply canceling the connection between the busbar 60 and the electrode 4. That is, at the time of replacement of the parts such as the heat insulating material 40 or the heater 50, the parts such as the heat insulating material 40 and the heaters 50 can be removed without detaching the terminal wires 56 connected to the respective heater terminals 50*c*, and thus the replacement work of parts can be performed in a short time. As a result, the time for stopping the heat treatment apparatus 1 can be shortened to enable an improvement in productivity. Further, since the entire treatment chamber unit 20 can be removed from the furnace shell 10, there is no need to remove parts with sealing surfaces that prevent gas leakage (for example, the heaters 50 and the electrodes 4) from the treatment container 30. Therefore, the number of replacements of parts that are prone to damage, foreign matter adhesion, or the like on or to the sealing surface is reduced, so that it is possible to shorten a maintenance time. Incidentally, the heat treatment apparatus 1 is restarted to resume a heat treatment on the workpiece W, while a maintenance work, such as replacement of parts of the carried out treatment chamber unit 20, is performed. Here, the assembled treatment chamber unit 20 with replaced parts is replaced again with the treatment chamber unit 20 present in the furnace shell 10 when replacing parts next time.

In order to facilitate the replacement of the treatment chamber unit 20, as illustrated in FIG. 1 and FIG. 2, conveyance rollers 13, which are in contact with the outer surface of the bottom surface portion 30*f* of the treatment container 30, are preferably provided on the inner surface of the wall surface portion 10*f* (a "bottom surface portion 10*f*" below) at the lower end of the furnace shell 10 in the Z direction. A plurality of the conveyance rollers 13 are arranged at appropriate intervals on the inner surface of the bottom surface portion 10*f* of the furnace shell 10 so that each rotation shaft is parallel to the Y direction and the treatment container 30 is stably supported. Such conveyance rollers 13 are provided, thereby making it possible to smoothly carry the treatment chamber unit 20 in the furnace shell 10. This makes it possible to further shorten the time for the replacement of the parts such as the heat insulating material 40 or the heater 50.

Further, the position of the connection between the power reception portion 62 of the busbar 60 and the electrode 4 is preferably in the vicinity of the opening 11*a* in the furnace shell 10, as in this embodiment. This makes it easier for an operator to cancel the connection between the power reception portion 62 of the busbar 60 and the electrode 4 when replacing the treatment chamber unit 20. Further, when a new treatment chamber unit 20 is carried in, it becomes easier to connect the power reception portion 62 of the busbar 60 and the electrode 4. As a result, it is possible to perform the replacement work of the treatment chamber unit 20 in a shorter time. Incidentally, the term "vicinity" of the opening 11*a* in the furnace shell 10 mentioned here refers to a range where an operator can reach the position of the connection between the busbar 60 and the power supply portion (the electrode 4 in this embodiment) by extending his/her arm through the opening 11*a* of the furnace shell 10 and can connect the busbar 60 and the power supply portion and cancel the connection. For example, in the case where it is difficult to connect the busbar 60 in the new treatment chamber unit 20 and the power supply portion even when the operator can reach the position of the connection between the busbar 60 and the power supply portion to cancel the connection, this position of the connection is not included in the "vicinity" of the opening 11*a* of the furnace shell 10. Further, the range of "vicinity," which varies depending on the height, arm length, or the like of the operator, is, for example, within 1.5 m in the depth direction (in the X direction in this embodiment) of the treatment container 30 from the outer surface of the wall surface portion (the side surface portion 10*a* in this embodiment) in which the opening 11*a* of the furnace shell 10 is provided.

Further, the positions of the respective heater terminals 50*c* are preferably concentrated on the side surface portion 30*d* on one side out of the side surface portions 30*c*, 30*d* at both ends of the treatment container 30 in the Y direction. With this, the busbars 60 also only need to be installed on one side, so that it makes it easier to perform the connection work between the busbar 60 and the power supply portion and the connection cancellation work. In addition to this, by concentrating the installation positions of the busbars 60 on one side, the width of the treatment chamber unit 20 can be shortened and miniaturization of the heat treatment apparatus 1 can be achieved.

Figure 10:
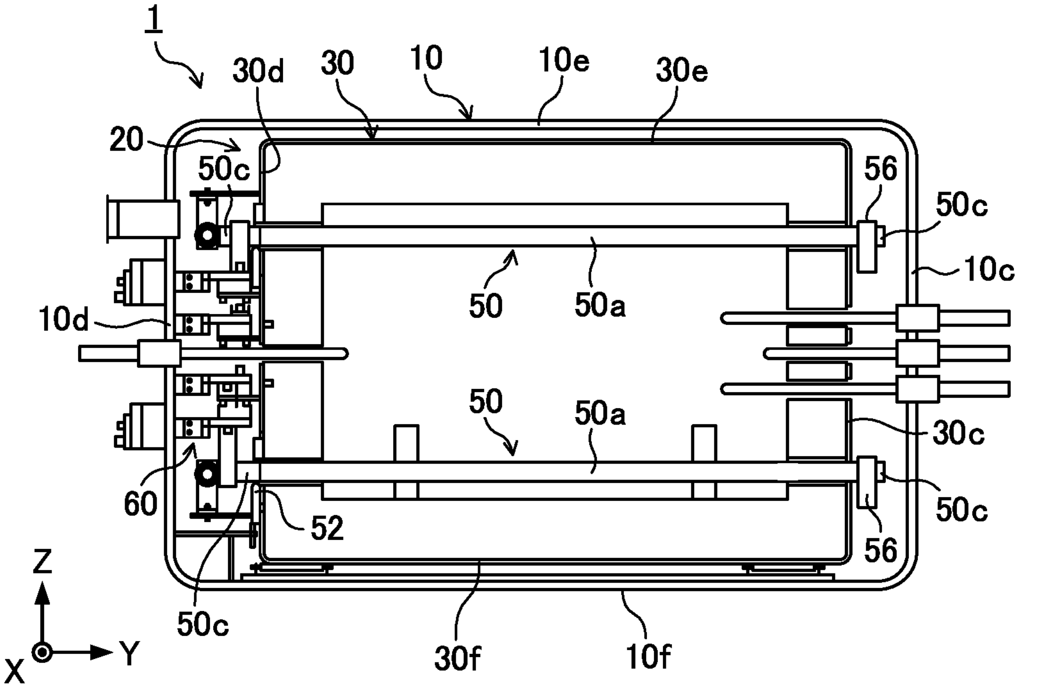
FIG. 10 is a cross-sectional view that illustrates a shape example of the heater, which is vertical to the X direction of the heat treatment apparatus.
Figure 11:
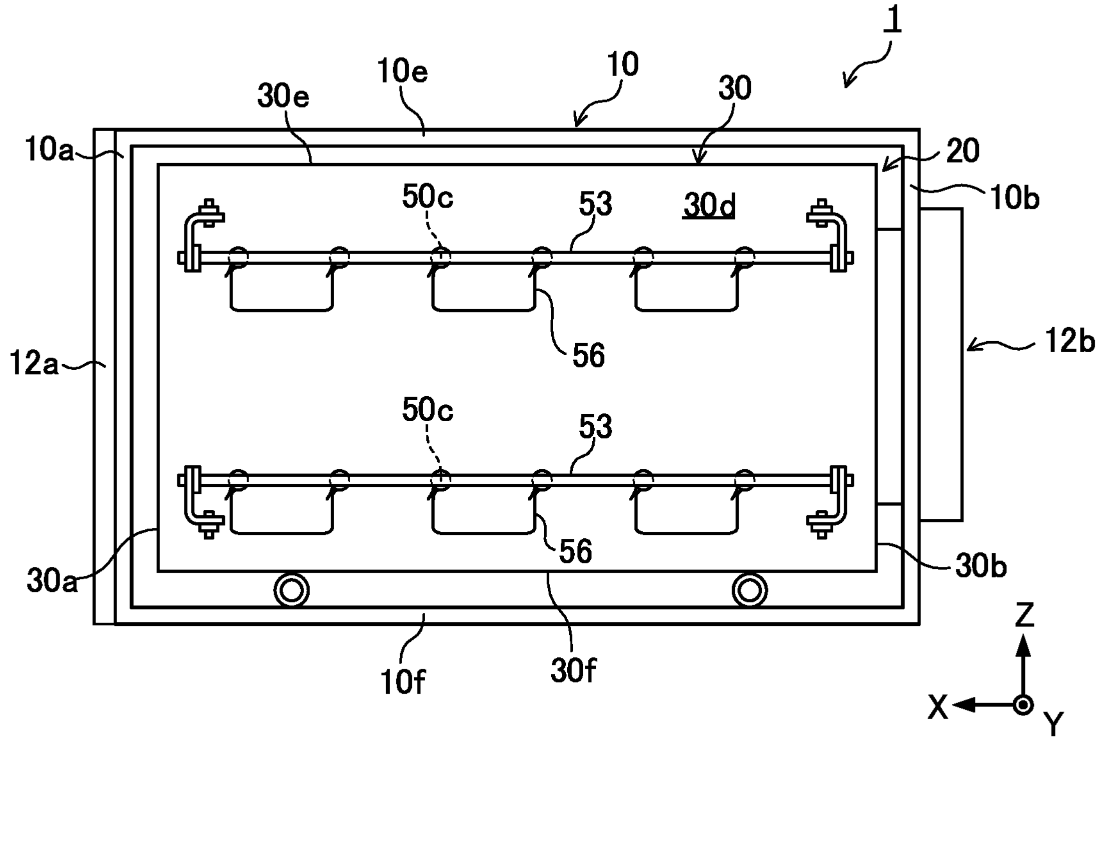
FIG. 11 is a side view of the heat treatment apparatus seen from a side where the busbars are not provided in the case of the heater shape illustrated in FIG. 10.

Although the U-shaped heater 50 is employed in this embodiment, the heater 50 may be a straight-shaped heater without the folded portion 50*b*, for example. In this case, as illustrated in FIG. 10, the heater terminals 50*c* are in a state of projecting from the side surface portion 30*c* and the side surface portion 30*d* of the treatment container 30 respectively. At this time, as illustrated in FIG. 11, for example, by taking each two of the heater terminals 50*c* projecting from the side surface portion 30*d* as one set and connecting each two heater terminals 50*c* with the terminal wire 56, the busbars 60 can be concentrated on the side surface portion

30*d* on one side of the treatment container 30. However, in the case of the U-shaped heater 50, it becomes possible to arrange the folded portion 50*b* of the heater 50 in the treatment container 30. This allows the heat treatment apparatus 1 to be even smaller in size than the case where the heater 50 has a straight shape. Further, in the case where a heat treatment requiring, for example, vacuuming is performed, the time required for the vacuuming can be shortened as long as the heat treatment apparatus 1 can be reduced in size. Thus, the heater 50 is preferred to be the U-shaped heater.

Incidentally, in the heat treatment apparatus 1 in this embodiment, the heaters 50 are provided so as to penetrate the treatment container 30 in the Y direction, but the heaters 50 may be provided so as to penetrate the treatment container 30 in the Z direction, for example. Even if the heater terminals 50*c* are located on the outside of the top surface portion 30*e* of the treatment container 30, for example, it is possible to perform such replacement of the treatment chamber unit 20 as described above, as long as the busbars 60 are located on the top surface portion 30*e* of the treatment container 30 and the power supply portions are provided outside the treatment container 30 (on the top surface portion 10*e* of the furnace shell 10, for example). Further, even in the heat treatment apparatus 1 having such a configuration, the busbars 60 are preferably concentrated on one side of the treatment container 30 in the Z direction. Thus, the position of the connection between the busbar 60 and the power supply portion is preferably arranged on, out of a pair of the facing wall surface portions of the treatment container 30 (the side surface portions 30*c*, 30*d* in the example illustrated in FIG. 2), the wall surface portion on the same side (the side surface portion 30*d* in the example illustrated in FIG. 2). This makes it possible to easily perform the connection work between the busbar 60 and the power supply portion and the connection cancellation work, and at the same time, achieve the reduction in size of the heat treatment apparatus 1.

In the foregoing, one embodiment of the present invention has been explained, but, the present invention is not limited to such an example. It is apparent that a person skilled in the art is able to devise various variation or modification examples within the scope of the technical spirit described in the claims, and it should be understood that such examples belong to the technical scope of the present invention as a matter of course.

Figure 12:
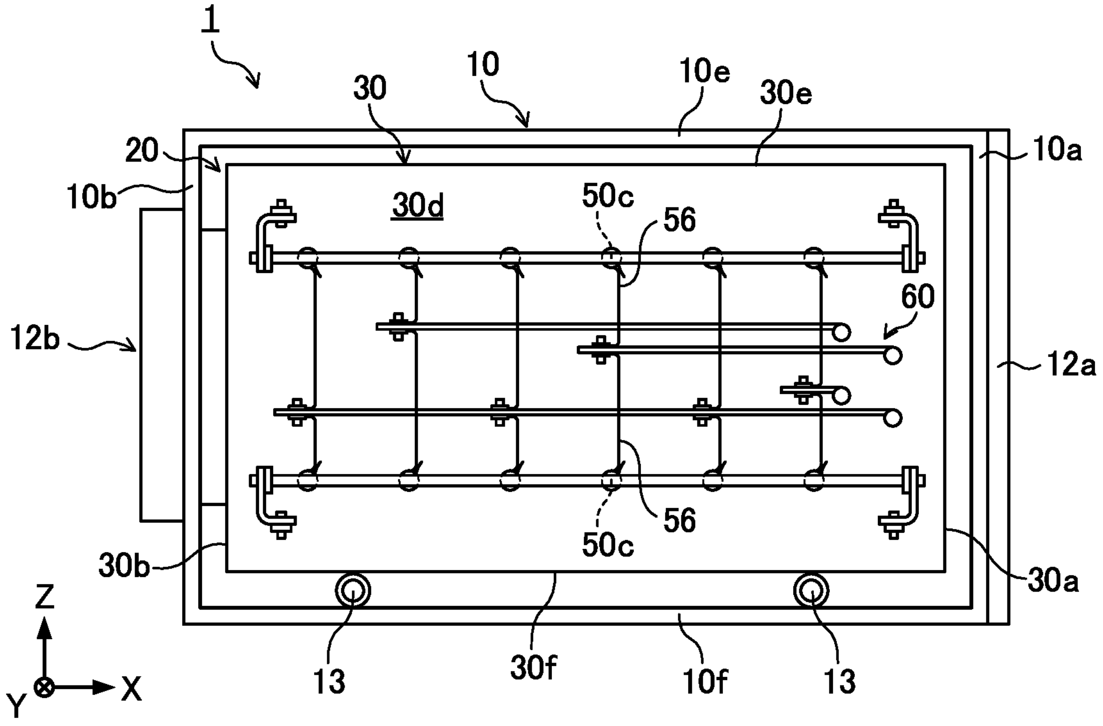
FIG. 12 is a side view of a heat treatment apparatus according to another embodiment, where a furnace shell on a paper front side is not illustrated.

For example, the position of the connection between the busbar 60 and the terminal wire 56 may be the position illustrated in FIG. 12. That is, the position of the connection between the busbar 60 and the terminal wire 56 is not limited to the position illustrated in FIG. 5, but is changed appropriately. Further, the number of busbars 60 is changed appropriately so as to perform an appropriate wiring process according to the number of heaters 50 to be used, the size of the heat treatment apparatus 1, or the like.

INDUSTRIAL APPLICABILITY

The present invention can be utilized for various heat treatments in a heating apparatus, a carburizing treatment apparatus, and so on.

EXPLANATION OF CODES

1 heat treatment apparatus
2 thermocouple
3 gas inlet
4 electrode
10 furnace shell
10*a* side surface portion of furnace shell
10*b* side surface portion of furnace shell
10*c* side surface portion of furnace shell
10*d* side surface portion of furnace shell
10*e* top surface portion of furnace shell
10*f* bottom surface portion of furnace shell
11*a* opening of furnace shell
11*b* opening of furnace shell
12*a* furnace shell door
12*b* furnace shell door
13 conveyance roller
20 treatment chamber unit
30 treatment container
30*a* side surface portion of treatment container
30*b* side surface portion of treatment container
30*c* side surface portion of treatment container
30*d* side surface portion of treatment container
30*e* top surface portion of treatment container
30*f* bottom surface portion of treatment container
31 opening of treatment container
32 support post member
33 plate
34 insulating member
40 heat insulating material
50 heater
50*a* heating element
50*b* folded portion
50*c* heater terminal
51 heater supporting member
51*a* extending portion of heater supporting member
52 heater supporting member
53 pop-out prevention member
54 L-shaped bracket
54*a* opening
55 sleeve
56 terminal wire
60 busbar
61 container-side fixing portion
62 power reception portion
W workpiece

The invention claimed is:

1. A heat treatment apparatus, comprising:
a treatment chamber unit that is, inside a furnace shell, detachably fixed to the furnace shell; and
a power supply portion, wherein
the treatment chamber unit includes:
a treatment container in which a heat treatment is performed on a workpiece;
a heat insulating material provided inside the treatment container;
a heater that has a heating element located inside the treatment container and has a terminal located outside the treatment container; and
a busbar that is provided on the outside of the treatment container and is electrically connected to the terminal of the heater,
the power supply portion is provided outside the treatment container, and
the busbar and the power supply portion are detachably connected to each other,
wherein a position of connection between the busbar and the power supply portion is in the vicinity of an opening in the furnace shell,
the opening is an opening to carry out/in the treatment chamber unit from/into the furnace shell, and the position of connection is accessible through the opening.

2. The heat treatment apparatus according to claim 1, wherein the treatment chamber unit includes a plurality of the busbars, and the respective busbars are arranged on a first wall surface portion, amongst out of the first wall surface portion and a second wall surface portion, which are a pair of facing wall surface portions of the treatment container.

3. The heat treatment apparatus according to claim 2, wherein the heater has a U-shape, and a folded portion of the heating element is located inside the treatment container.

4. A heat treatment apparatus, comprising:

a treatment chamber unit that is, inside a furnace shell, detachably fixed to the furnace shell; and a power supply portion, wherein the treatment chamber unit includes:

a treatment container in which a heat treatment is performed on a workpiece;

a heat insulating material provided inside the treatment container;

a heater that has a heating element located inside the treatment container and has a terminal located outside the treatment container; and a busbar that is provided on the outside of the treatment container and is electrically connected to the terminal of the heater, the power supply portion is provided outside the treatment container, and the busbar and the power supply portion are detachably connected to each other, wherein the treatment chamber unit includes a plurality of the busbars, the respective busbars are arranged on a first wall surface portion, out of the first wall surface portion and a second wall surface portion, which are a pair of facing wall surface portions of the treatment container, the heater has a U-shape, a folded portion of the heating element is located inside the treatment container, a heater supporting member that supports the heater is provided on the treatment container, the heater supporting member includes an extending portion that extends from the second wall surface portion of the treatment container toward the inside of the treatment container and supports the folded portion of the heating element, and the extending portion slopes downward with respect to a horizontal plane as the extending portion moves away from the second wall surface portion of the treatment container.

5. A heat treatment apparatus, comprising:

a treatment chamber unit that is, inside a furnace shell, detachably fixed to the furnace shell; and a power supply portion, wherein the treatment chamber unit includes:

a treatment container in which a heat treatment is performed on a workpiece;

a heat insulating material provided inside the treatment container;

a heater that has a heating element located inside the treatment container and has a terminal located outside the treatment container; and a busbar that is provided on the outside of the treatment container and is electrically connected to the terminal of the heater, the power supply portion is provided outside the treatment container, and the busbar and the power supply portion are detachably connected to each other, wherein the treatment chamber unit includes a plurality of the busbars, the respective busbars are arranged on a first wall surface portion, out of the first wall surface portion and a second wall surface portion, which are a pair of facing wall surface portions of the treatment container, the heater has a U-shape, a folded portion of the heating element is located inside the treatment container, and a pop-out prevention member that prevents the heater from popping out of the first wall surface portion of the treatment container is provided on the first wall surface portion of the treatment container.

6. A heat treatment apparatus, comprising:

a treatment chamber unit that is, inside a furnace shell, detachably fixed to the furnace shell; and a power supply portion, wherein the treatment chamber unit includes:

a treatment container in which a heat treatment is performed on a workpiece;

a heat insulating material provided inside the treatment container;

a heater that has a heating element located inside the treatment container and has a terminal located outside the treatment container; and a busbar that is provided on the outside of the treatment container and is electrically connected to the terminal of the heater, the power supply portion is provided outside the treatment container, and the busbar and the power supply portion are detachably connected to each other, wherein a conveyance roller that carries the treatment chamber unit is provided on an inner surface of a bottom surface portion of the furnace shell.

* * * * *